(12) United States Patent
Heuser et al.

(10) Patent No.: US 6,582,843 B1
(45) Date of Patent: Jun. 24, 2003

(54) FUEL CELL SYSTEM

(75) Inventors: Ralf Heuser, Ulm (DE); Lars Kaufmann, Dettingen/Teck (DE); Paul Kaupmann, Owen/Teck (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 85 days.

(21) Appl. No.: 09/654,903

(22) Filed: Sep. 5, 2000

(30) Foreign Application Priority Data

Sep. 2, 1999 (DE) .......................................... 199 41 711

(51) Int. Cl.$^7$ .......................... H01M 8/04; H01M 10/50
(52) U.S. Cl. .............................. 429/26; 429/34; 429/120
(58) Field of Search ............................. 429/26, 34, 38, 429/39, 20, 13, 120

(56) References Cited

U.S. PATENT DOCUMENTS

| 4,120,787 A | * 10/1978 | Yargeau ........................ 210/26 |
| 5,470,671 A | 11/1995 | Fletcher et al. ................ 429/26 |
| 2001/0033956 A1 | * 10/2001 | Appleby et al. ............... 429/34 |
| 2002/0004152 A1 | * 1/2002 | Clawson et al. ............... 429/17 |

* cited by examiner

Primary Examiner—Patrick Ryan
Assistant Examiner—R Alejandro
(74) Attorney, Agent, or Firm—Crowell & Moring LLP

(57) ABSTRACT

A fuel cell section system has a media-cooled fuel cell with an anode space and a cathode space. A common delivery device is provided for introducing cooling medium into both the fuel cell and a condenser for condensation of water from outgoing cathode air.

17 Claims, 3 Drawing Sheets

FUEL CELL SYSTEM

BACKGROUND AND SUMMARY OF THE INVENTION

This application claims the priority of German patent document 199 41 711.3, filed Sep. 2, 1999, the disclosure of which is expressly incorporated by reference herein.

The invention relates to a fuel cell arrangement having a fuel cell that is cooled by a flow of a cooling medium.

U.S. Pat. No. 5,470,671 discloses a fuel cell which is cooled by air. The thermal integration of such a fuel cell in a fuel cell system, however, requires high expenditures because many components must be maintained very precisely at different temperature levels, and with different cooling or heating requirements must be taken into account.

It is an object of the invention to provide a fuel cell section system which simplifies the thermal integration of the fuel cell system.

This and other objects and advantages are achieved by the fuel cell arrangement according to the invention, which includes a common delivery device for introducing cooling medium into the fuel cell and a condenser for the condensation of water from outgoing cathode air.

The advantages of this arrangement are that, on the one hand, it permits a very compact construction because the components can be coupled directly; constructional volume is minimized; and pressure losses of the cooling medium are reduced by means of short cooling routes. On the other hand, for cooling the components, only one delivery device for the cooling medium is required, so that the number of system components can be reduced.

Additional advantages and further developments of the invention are indicated in the description and attached drawing.

It is understood that the above-mentioned characteristics and those which will be explained in the following can be used not only in the described combination but also in other combinations or alone, without leaving the scope of the present invention.

Other objects, advantages and novel features of the present invention will become apparent from the following detailed description of the invention when considered in conjunction with the accompanying drawings.

DETAILED DESCRIPTION OF THE DRAWINGS

Fuel cell systems, for example, those with fuel cells having polymer electrolyte membranes (PEM), normally require a condenser in which humid outgoing cathode air of the fuel cell is cooled and dehumidified. The water thus obtained is returned to the water balance of the system where it is made available for humidifying the fuel cell membrane or for a reforming process when generating gas in the fuel cell system. In this case, the fuel cell as well as the condenser can be cooled by means of gaseous or liquid cooling media, preferably by means of air or water.

As used herein, the term fuel cell means an individual fuel cell as well as a fuel cell stack with a plurality of fuel cells which are connected with one another in series and/or in parallel in order to supply power which is suitable, for example, for driving a vehicle. Furthermore, the invention will be explained by means of an air-cooled fuel cell. For cooling the fuel cell section system according to the invention, however, cooling media other than air can also be used.

In a preferred fuel cell system according to the invention, a single ventilator is advantageously used as a delivery device for cooling media in order to optimally utilize the air flow as a cooling medium, the ventilator as a component per se and the electric power required for driving the ventilator. The delivery devices preferably are suitable for introducing a gaseous cooling medium such as fans, compressors, Wankel engines, and the like.

Figure 1:
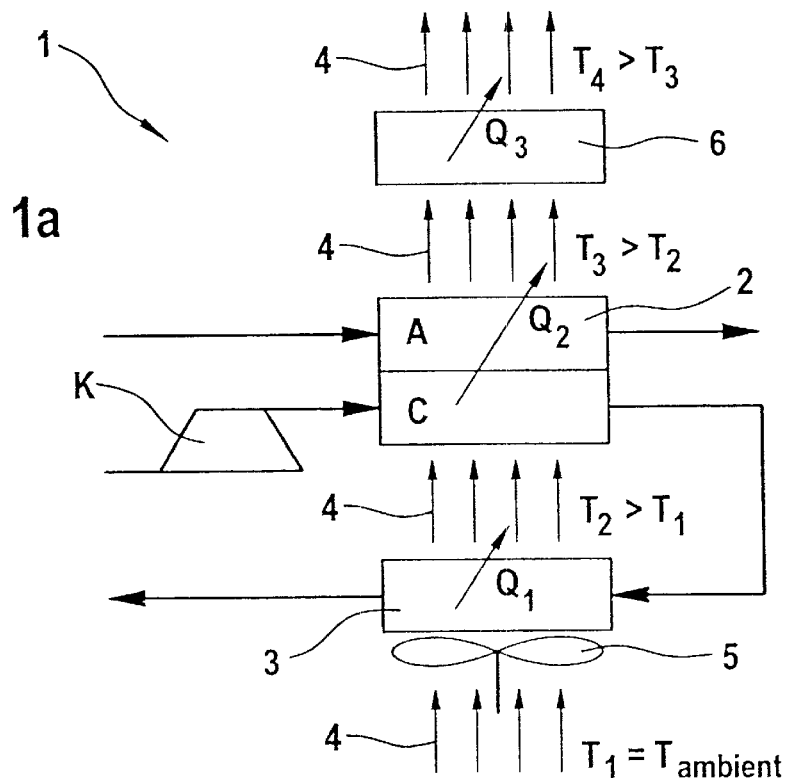
FIGS. 1a, b are schematic representations of two alternative arrangements of a delivery device in a fuel cell system according to the invention, which supplies a fuel cell, a Selox unit and a condenser jointly with cooling medium.
Figure 1:
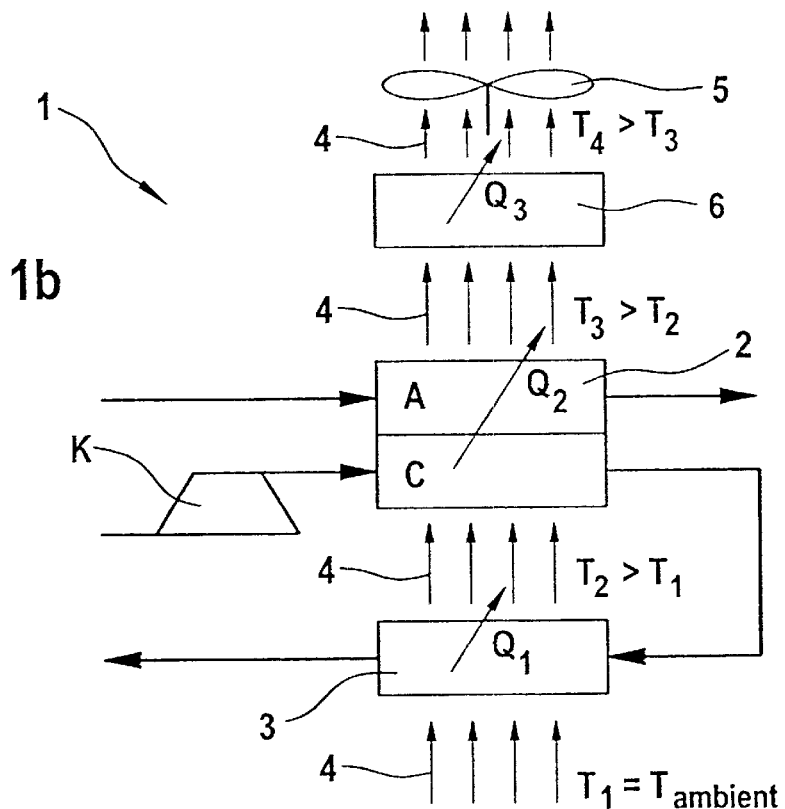

FIG. 1a shows a preferred arrangement of the fuel cell arrangement 1 according to the invention, in which a fuel cell 2 with the anode space A and the cathode space C and a condenser 3 are supplied and cooled by means of an air flow 4 of a ventilator 5 arranged on the inflow side of the elements to be cooled.

In addition, a carbon monoxide removal unit 6, preferably a unit for the selective removal of carbon monoxide from a reaction medium flow of the fuel cell 2, is provided on the downstream side of the fuel cell 2 relative to the air flow. In front of the cathode C, a compressor K is arranged which supplies the cathode C with process air. Additional supply lines of the fuel cell 2 for supplying reaction media, such as hydrogen to the anode A and oxygen to the cathode C, as well as for removing reaction media, such as the outgoing cathode air, from the cathode C to the condenser 3, are indicated by arrows but are not explained in detail. The process air, which is provided for supplying the cathode C with oxygen, is guided separately from the air flow for cooling the arrangement.

FIG. 1b shows another preferred arrangement of the fuel cell section system 1 according to the invention, in which the ventilator 5 is arranged downstream of the elements to be cooled (the fuel cell 2 and the carbon monoxide removal unit 6).

To utilize the low temperature level of the environment, a condenser 3 is connected in front of the air-cooled fuel cell 2, which condenser 3 separates water from the outgoing cathode air of the fuel cell. Thus, the condenser introduces only a small amount of heat $Q_1$ into the cooling medium 4.

The input temperature of the cooling medium 4 as it enters the condenser 3 is $T_1$ and preferably corresponds to the ambient temperature $T_{ambient}$. The cooling medium 4 leaves the condenser at a preferably slightly higher temperature $T_2$.

The slight temperature increase of the air flow 4 does not have a negative influence because $Q_1$ is significantly lower than the waste heat $Q_2$ of the fuel cell which occurs in the flow direction of the cooling medium 4 in the fuel cell. The cooling medium 4 leaves the fuel cell 2 at the temperature $T_3$.

Another element 6 to be cooled can be arranged in the cooling medium flow 4 on the outflow side of the fuel cell 2. This element 6 is preferably at a higher temperature level than the fuel cell so that the cooling medium 4 can still dissipate the heat flow $Q_3$. Such an element is preferably a carbon monoxide removal unit, particularly preferably a unit for the selective removal of carbon monoxide from a reformate flow for supplying the fuel cell.

The cooling medium enters into the element 6 at the temperature $T_3$, and dissipates the heat quantity $Q_3$ there, raising its temperature from $T_3$ to $T_4$.

Relative to the flow direction of the cooling medium 4, the elements 3, 2, 6 to be cooled are arranged in the order of rising temperature level.

Figure 2A:
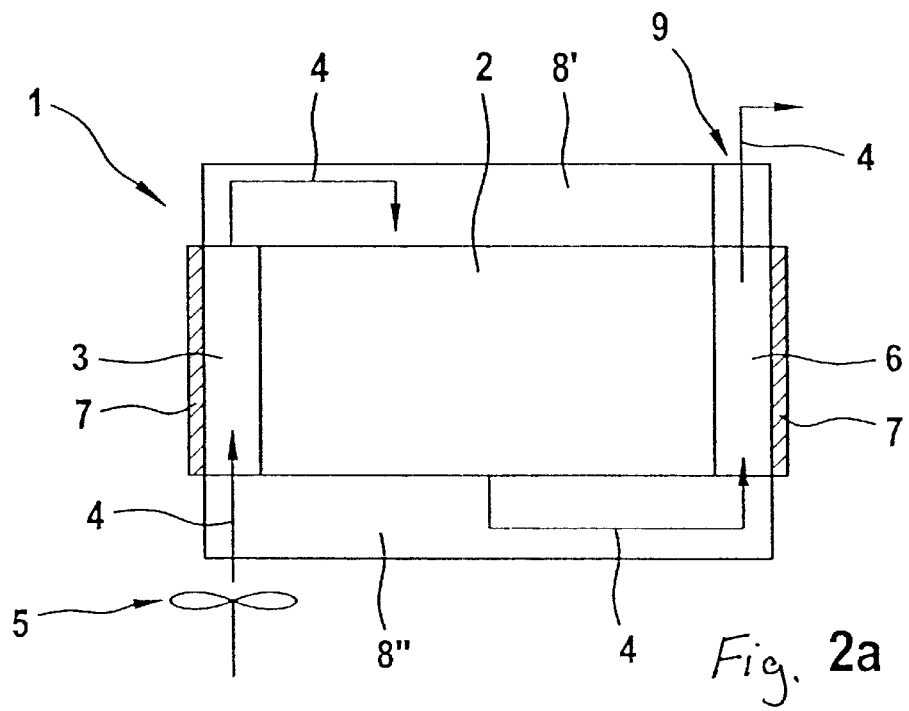
FIG. 2 is a schematic representation of an arrangement according to the invention in a fuel cell stack.
Figure 2B:
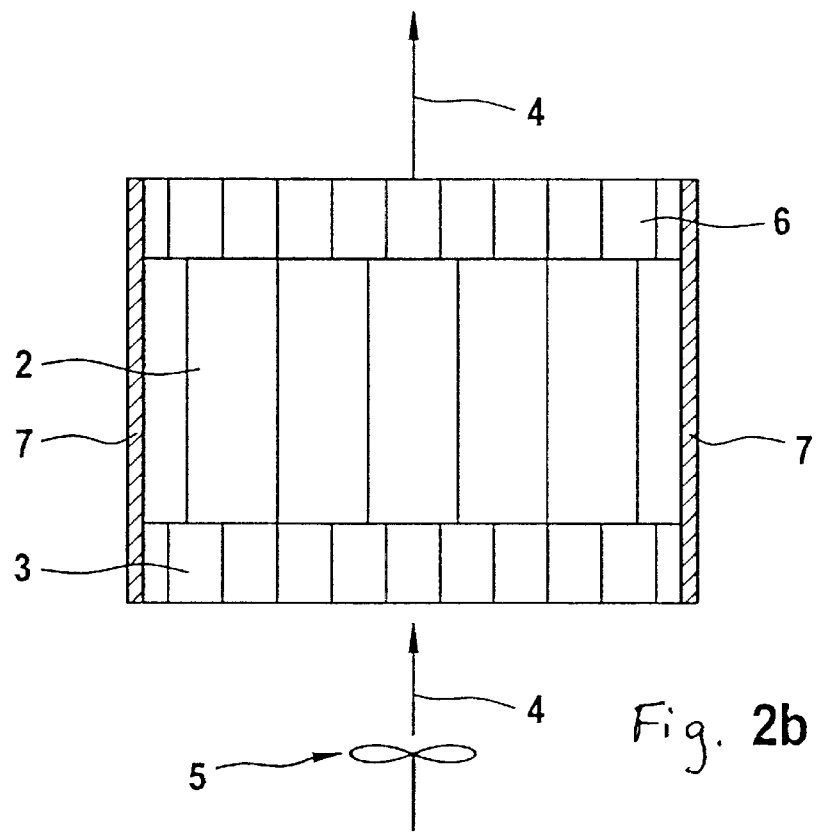

FIGS. 2a and 2b illustrate preferred embodiments of the fuel cell section system according to the invention. Identical elements have the same reference number as in FIG. 1. In this case, the fuel cell is formed by a stack of individual fuel cells.

FIG. 2a shows a particularly compact arrangement. The condenser 3 and the carbon monoxide removal unit 6 are arranged inside the end plates 7 and in the stacking direction of the fuel cell 2. The end plates 7 close off the section system toward the outside. The condenser 3 and the carbon monoxide removal unit 6 are connected with one end plate 7 respectively of the fuel cell 2. As indicated by arrows, the cooling medium 4 is guided and is distributed into the fuel cell 2, so that the cooling medium flows parallel to the plates in the fuel cell stack.

The cooling medium 4 is guided from the ventilator 5 to the condenser 3 and cools the latter. It then enters the cooling medium feeding duct 8', is distributed there into the fuel cell 2, which it also cools, and enters the cooling medium discharge duct 8". From there, the cooling medium 4 flows into and cools the carbon monoxide removal unit 6, and leaves the fuel cell section system 1 at the output 9 of the section system.

The carbon monoxide removal unit 6 can be constructed in one or several stages.

FIG. 2b shows another preferred construction of the fuel cell section system according to the invention. Here also, the elements 3, 6 to be cooled are arranged inside the end plates 7 of the fuel cell 2 but perpendicularly to the stacking direction of the fuel cell 2. The condenser 3 and the carbon monoxide removal unit 6 are each connected with the two end plates 7. As in FIG. 2a, this arrangement represents a plate arrangement in which the cooling medium 4 flows parallel to the plates of the reaction spaces. However, the construction is simpler because the cooling medium feeding and removal ducts 8', 8" can be eliminated here. The flow of the cooling medium 4 need not be deflected as in FIG. 2a.

As in FIG. 2a, the ventilator 5 is arranged here on the inflow side relative to the air flow and presses the cooling medium into the fuel cell arrangement. However, it may also be arranged on the outflow side and suck the cooling medium out of the system.

Figure 3:
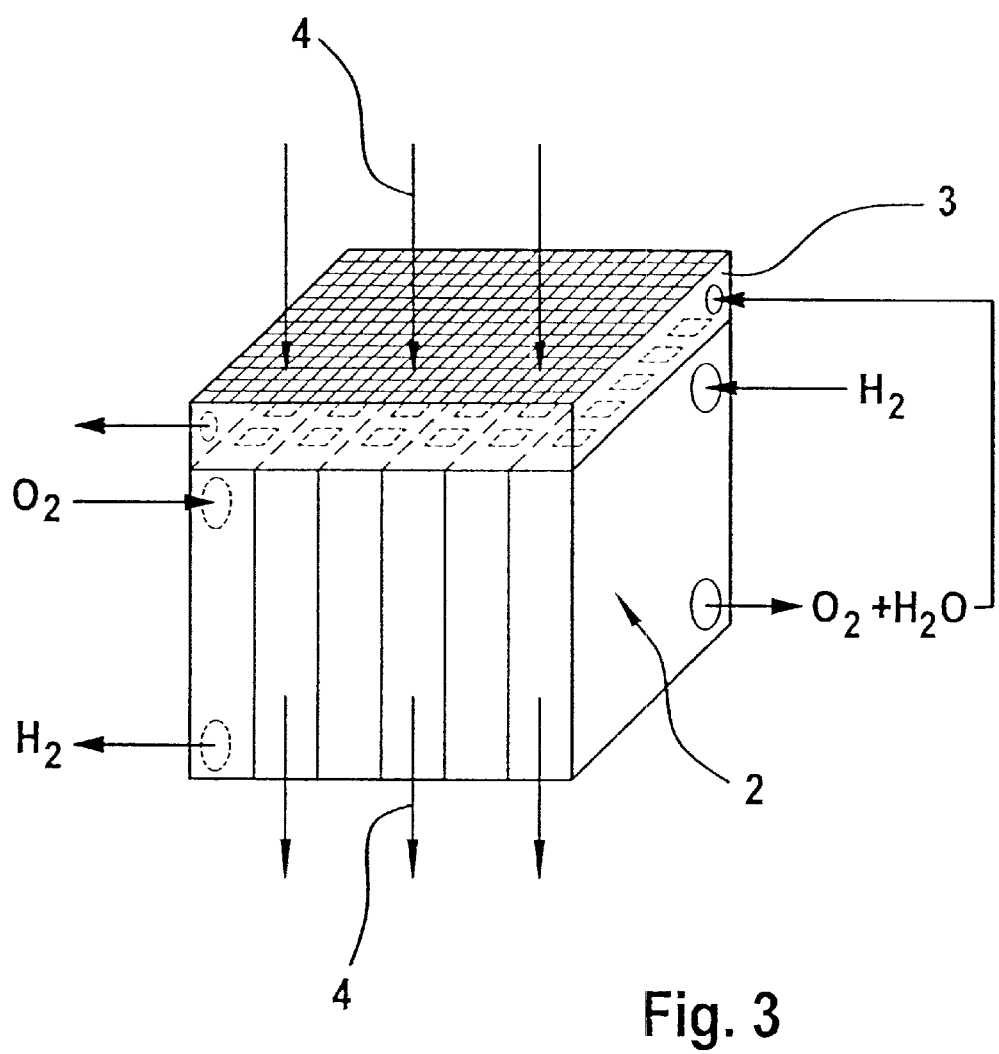
FIG. 3 is a schematic representation of a cooling medium supply in a fuel cell stack.

FIG. 3 is a schematic view of the course of the flow of the cooling medium 4 and the reaction media of a fuel cell 2. The fuel gas is globally indicated as $H_2$; the oxidizing medium is indicated as $O_2$. The outgoing cathode gas is designated $O_2+H_2O$. However, the precise composition of the reaction media and the exhaust gas depends on the selected system.

The cooling medium 4 flows perpendicularly to the stacking direction. In this case, the cooling medium 4 again first enters into the condenser 3 and then cools the fuel cell 2. A carbon monoxide removal unit 6 is not shown, but may be provided. The outgoing cathode gas is supplied to the condenser 3 for dehumidification.

The illustrated guiding of the media is shown only as an example and does not indicate a limiting of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system, comprising:
   at least one fuel cell;
   a condenser for condensation of water from outgoing air discharged from said fuel cell; and
   a common delivery device for introducing a flow of cooling medium which cools both the fuel cell unit and the condenser, and which flows consecutively first through the condenser and thereafter through the at least one fuel cell.

2. The fuel cell system according to claim 1, wherein:
   the at least one fuel cell has a temperature that is higher than a temperature of the condenser; and
   the condenser is disposed upstream of the at least one fuel cell relative to a flow direction of said cooling medium as it flows consecutively through the condenser and the at least one fuel cell.

3. The fuel cell system according to claim 1, wherein the at least one fuel cell and the condenser are combined in a common component.

4. The fuel cell system according to claim 1, wherein the at least one fuel cell, the condenser and the delivery device are combined in a common component.

5. The fuel cell system according to claim 1, wherein the delivery device is arranged to provide a common flow of cooling medium to the at least one fuel cell, the condenser and a carbon monoxide removal unit.

6. The fuel cell system according to claim 5, wherein the carbon monoxide removal unit selectively oxidizes carbon monoxide.

7. The fuel cell system according to claim 5, wherein the delivery device is arranged upstream of the at least one fuel cell, the condenser and the carbon monoxide removal unit, which are cooled jointly.

8. The fuel cell system according to claim 5, wherein the delivery device is arranged downstream of the at least one fuel cell, the condenser and the carbon monoxide removal unit, which are cooled jointly.

9. The fuel cell system according to claim 1, wherein the delivery device introduces a gaseous cooling medium.

10. The fuel cell system according to claim 1, wherein the delivery device is a pump for introducing a fluid cooling medium.

11. The fuel cell system according to claim 1, wherein:
    the at least one fuel cell comprises a plurality of fuel cells arranged in a stacking direction and forming a fuel cell stack; and
    the condenser, the fuel cell stack and a carbon monoxide removal unit are arranged successively in the stacking direction, inside end plates of the fuel cell stack.

12. The fuel cell system according to claim 1, wherein:
    the at least one fuel cell comprises a plurality of fuel cells arranged in a stacking direction and forming a fuel cell stack; and
    the condenser, the fuel cell stack and a carbon monoxide removal unit are arranged successively transversely to the stacking direction, inside end plates of the fuel cell stack.

13. A fuel cell system comprising:
    a fuel cell unit;

a condenser for condensation of water from gases discharged from said fuel cell unit; and a common delivery device for causing flow of a cooling medium which cools both said fuel cell unit and said condenser, said cooling medium flowing along a defined flow path; wherein, said condenser and said fuel cell unit are disposed sequentially in said flow path; and said condenser is situated up-stream of said fuel cell unit in said flow of cooling medium.

14. A fuel cell system according to claim 13, further comprising a carbon monoxide removal unit for removing carbon monoxide from gaseous fuel supplied to said fuel cell unit, wherein said carbon monoxide removal unit is situated downstream of said fuel cell unit in said flow of cooling medium.

15. A fuel cell according to claim 13, wherein said cooling medium is air.

16. A fuel cell according to claim 13, wherein said fuel cell unit, said condenser, said common delivery device and said flow path are contained in a common component.

17. A fuel cell system according to claim 13, wherein said fuel cell unit, said condenser, said carbon monoxide removal unit and said flow path are contained in a common component.

* * * * *